US012668170B2

(12) United States Patent (10) Patent No.: US 12,668,170 B2

Yamasaki et al. (45) Date of Patent: Jun. 30, 2026

(54) VEHICLE HAVING ROAD-SURFACE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 311 days.

(21) Appl. No.: 18/429,267

(22) Filed: Jan. 31, 2024

(65) Prior Publication Data

US 2024/0270152 A1 Aug. 15, 2024

(30) Foreign Application Priority Data

Feb. 14, 2023 (JP) ................................. 2023-021175

(51) Int. Cl.
 *B60Q 1/02* (2006.01)
 *G03B 29/00* (2021.01)
 *H04N 9/31* (2006.01)

(52) U.S. Cl.
 CPC .............. *B60Q 1/02* (2013.01); *G03B 29/00* (2013.01); *H04N 9/3155* (2013.01); *B60Q 2400/50* (2013.01)

(58) Field of Classification Search
 CPC ...... B60Q 1/0023–04; B60Q 1/50–549; B60Q 2400/50; E01F 9/604–619; G03B 29/00; H04N 9/3155
 See application file for complete search history.

(56) References Cited

U.S. PATENT DOCUMENTS

| | | | | |
|---|---|---|---|---|
| 9,527,434 | B2 * | 12/2016 | Nakashima | ............ B60Q 1/143 |
| 10,134,283 | B2 | 11/2018 | Masuda et al. | |
| 12,128,815 | B2 * | 10/2024 | Nakashima | ............ B60Q 1/143 |

FOREIGN PATENT DOCUMENTS

| | | | | |
|---|---|---|---|---|
| JP | 2015-164828 A | 9/2015 | | |
| JP | 2016-055691 A | 4/2016 | | |
| JP | 2020-111284 A | 7/2020 | | |
| WO | WO-2022153754 A1 * | 7/2022 | ............ | B60Q 1/143 |

* cited by examiner

*Primary Examiner* — Jason M Han

(74) *Attorney, Agent, or Firm* — Rimon P.C.

(57) ABSTRACT

A vehicle having a road-surface rendering function includes a light projection member, a rain detection member, and a control unit. The light projection member is configured to perform light projection for road-surface rendering in the vehicle that is traveling and to render a road-surface rendered image onto a road surface surrounding the vehicle that is traveling. The rain detection member is configured to perform detection of rain or a rain-associated state in the vehicle. The control unit is configured to control the light projection for the road-surface rendering by the light projection member in accordance with the detection by the rain detection member. The control unit is configured to determine that the rain is falling and suppress the light projection for the road-surface rendered image from the light projection member when the rain detection member detects the rain or the rain-associated state.

20 Claims, 7 Drawing Sheets

FIG. 3

VEHICLE HAVING ROAD-SURFACE RENDERING FUNCTION

CROSS-REFERENCE TO RELATED APPLICATIONS

The present application claims priority from Japanese Patent Application No. 2023-021175 filed on Feb. 14, 2023, the entire contents of which are hereby incorporated by reference.

BACKGROUND

The disclosure relates to vehicles having road-surface rendering functions.

Japanese Unexamined Patent Application Publication (JP-A) Nos. 2016-055691, 2020-111284, and 2015-164828 disclose projecting light from a vehicle to render various patterns on a road surface on which the vehicle is traveling.

By rendering any of such patterns on the road surface, the vehicle can provide, via the road surface, travel-related information about the vehicle to the driver who drives the vehicle.

SUMMARY

An aspect of the disclosure provides a vehicle having a road-surface rendering function. The vehicle includes a light projection member, a rain detection member, and a control unit. The light projection member is configured to perform light projection for road-surface rendering in the vehicle that is traveling. The light projection member is configured to render a road-surface rendered image onto a road surface surrounding the vehicle that is traveling. The rain detection member is configured to perform detection of rain or a rain-associated state in the vehicle. The control unit is configured to control the light projection for the road-surface rendering by the light projection member in accordance with the detection by the rain detection member. The control unit is configured to determine that the rain is falling and suppress the light projection for the road-surface rendered image from the light projection member when the rain detection member detects the rain or the rain-associated state.

An aspect of the disclosure provides a vehicle having a road-surface rendering function. The vehicle includes a light projection member and circuitry. The light projection member includes a light source and is configured to perform light projection for road-surface rendering in the vehicle that is traveling and is to render a road-surface rendered image onto a road surface surrounding the vehicle that is traveling. The circuitry is configured to perform detection of rain or a rain-associated state in the vehicle. The circuitry is configured to control the light projection for the road-surface rendering by the light projection member in accordance with the detection. The circuitry is configured to determine that the rain is falling and suppress the light projection for the road-surface rendered image from the light projection member when the rain or the rain-associated state is detected.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 3 schematically illustrates the structure and the disposition of a right headlamp module and a left headlamp module at the front end of the vehicle in FIG. 1;

DETAILED DESCRIPTION

A road-surface rendered image rendered on the road surface as a result of projecting light from the vehicle is not limited to an image that can be visually recognized easily by the driver who drives the vehicle.

For example, when the road surface is entirely wet due to rain, the light projected from the vehicle for the road-surface rendering is mostly reflected toward, for example, an oncoming vehicle, thus resulting in a reduced quantity of light returning toward the vehicle that has projected the light. In this case, the road-surface rendered image may possibly be a pale image that is difficult to visually recognize by the driver who drives the vehicle that has projected the light. On the other hand, for example, when the road surface is to totally reflect light to cause intense regular reflection to occur, there is a concern that a driver who drives an oncoming vehicle or a pedestrian walking toward the vehicle may be irradiated with intense light via the road surface.

It is desirable that the road-surface rendering from the vehicle be improved.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
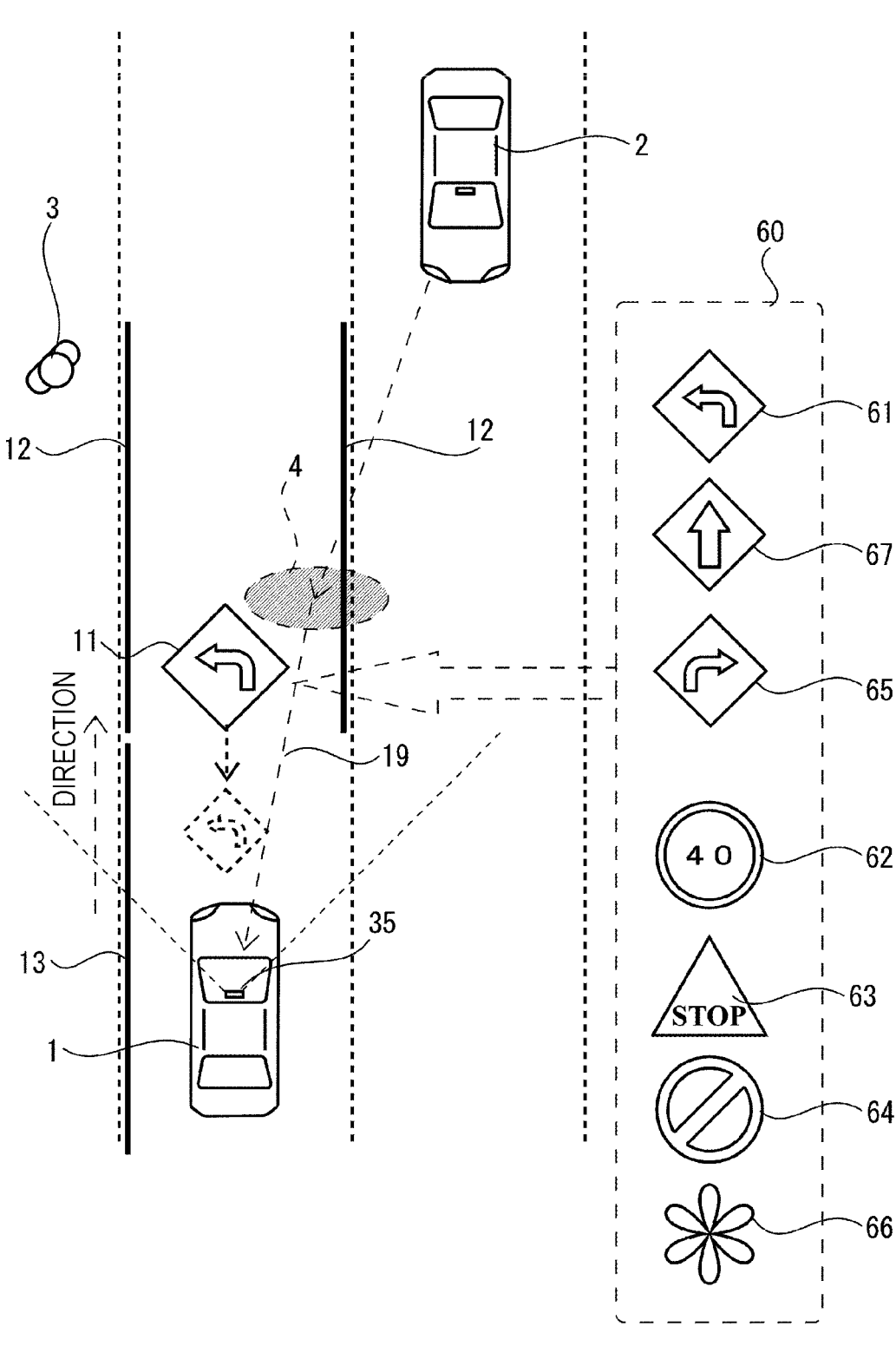
FIG. 1 illustrates an example of a traveling state of a vehicle according to an embodiment of the disclosure.

FIG. 1 illustrates an example of a traveling state of a vehicle 1 such as an automobile according to a first embodiment of the disclosure.

FIG. 1 illustrates the vehicle 1 traveling on one of lanes of a two-lane road. The automobile is an example of the vehicle 1. Other examples of the vehicle 1 include a bus, a truck, a motorcycle, and a personal mobility device. The vehicle 1 may be capable traveling based on autonomous driving including driving assistance.

An oncoming vehicle 2 is traveling on the opposite lane of the road. A pedestrian 3 is present on a road shoulder.

In such a travel environment, a driver who drives the vehicle 1 controls the vehicle 1 without causing the vehicle 1 to deviate from the road lane while paying attention to what is ahead in the traveling direction of the vehicle 1. When the travel environment is dark, the vehicle 1 may turn on the headlamp. A vehicle-exterior camera 35 to be described later is provided at the front of the vehicle cabin of the vehicle 1. A windshield is located in front of the vehicle-exterior camera 35.

With regard to such an vehicle 1, rendering of patterns by radiating visible light onto the road surface from the vehicle 1 is being researched and developed.

For example, FIG. 1 illustrates a road-surface rendered image 11 based on a simple pattern mimicking a road sign, lane boundary lines 12 extending along the left and right sides of the lane of the vehicle 1, and a road-shoulder boundary line 13 rendered alongside the road shoulder of the vehicle 1. The road-surface rendered image 11 is rendered in front of the vehicle 1 in the traveling direction for the driver who drives the vehicle 1. The lane boundary lines 12 and the road-shoulder boundary line 13 are rendered toward the pedestrian 3 on the road shoulder and toward the oncoming vehicle 2.

The right side of FIG. 1 illustrates multiple light projection patterns 60 each serving as a basis for the road-surface rendered image 11. In this case, a light projection pattern 61 for a left-turn indication, a light projection pattern 67 for a go-straight indication, a light projection pattern 65 for a right-turn indication, a light projection pattern 62 for a speed-limit indication, a light projection pattern 63 for indicating a stop position, a light projection pattern 64 for a no-crossing indication, and a histogram-based light projection pattern 66 for snowy or frozen road warning are illustrated. The vehicle 1 may select any of the multiple light projection patterns 60 in accordance with the traveling state and the travel environment and may project light corresponding to the light projection pattern.

By rendering a pattern, such as the road-surface rendered image 11, on the road surface, the vehicle 1 can provide travel-related information about the vehicle 1 to, for example, the driver via the road surface.

However, the road-surface rendered image 11 rendered on the road surface as a result of projecting light from the vehicle 1 in this manner is not always visually recognizable easily by, for example, the driver who drives the vehicle 1.

For example, when the road surface has a road-surface area that is to totally reflect light due to a puddle 4, the light projected from the vehicle 1 for the road-surface rendering is mostly reflected toward, for example, an oncoming vehicle, thus resulting in a reduced quantity of light returning toward the vehicle 1 that has projected the light. In this case, the road-surface rendered image 11 may possibly be a pale image that is difficult to visually recognize by the driver who drives the vehicle 1 that has projected the light.

On the other hand, if the road surface is to totally reflect light due to, for example, the puddle 4, there is a concern that the driver who drives the oncoming vehicle 2 and the pedestrian 3 walking toward the vehicle 1 may be irradiated with intense light via the road surface. Such intense reflection may also possibly occur in a part of the road-surface rendered image 11. A dashed arrow 19 in FIG. 1 indicates a situation where the light from the headlamp of the oncoming vehicle 2 is totally reflected by the puddle 4 on the road surface and is reflected as intense light toward the vehicle 1.

Accordingly, it is desirable that the road-surface rendering from the vehicle 1 be improved.

Figure 2:
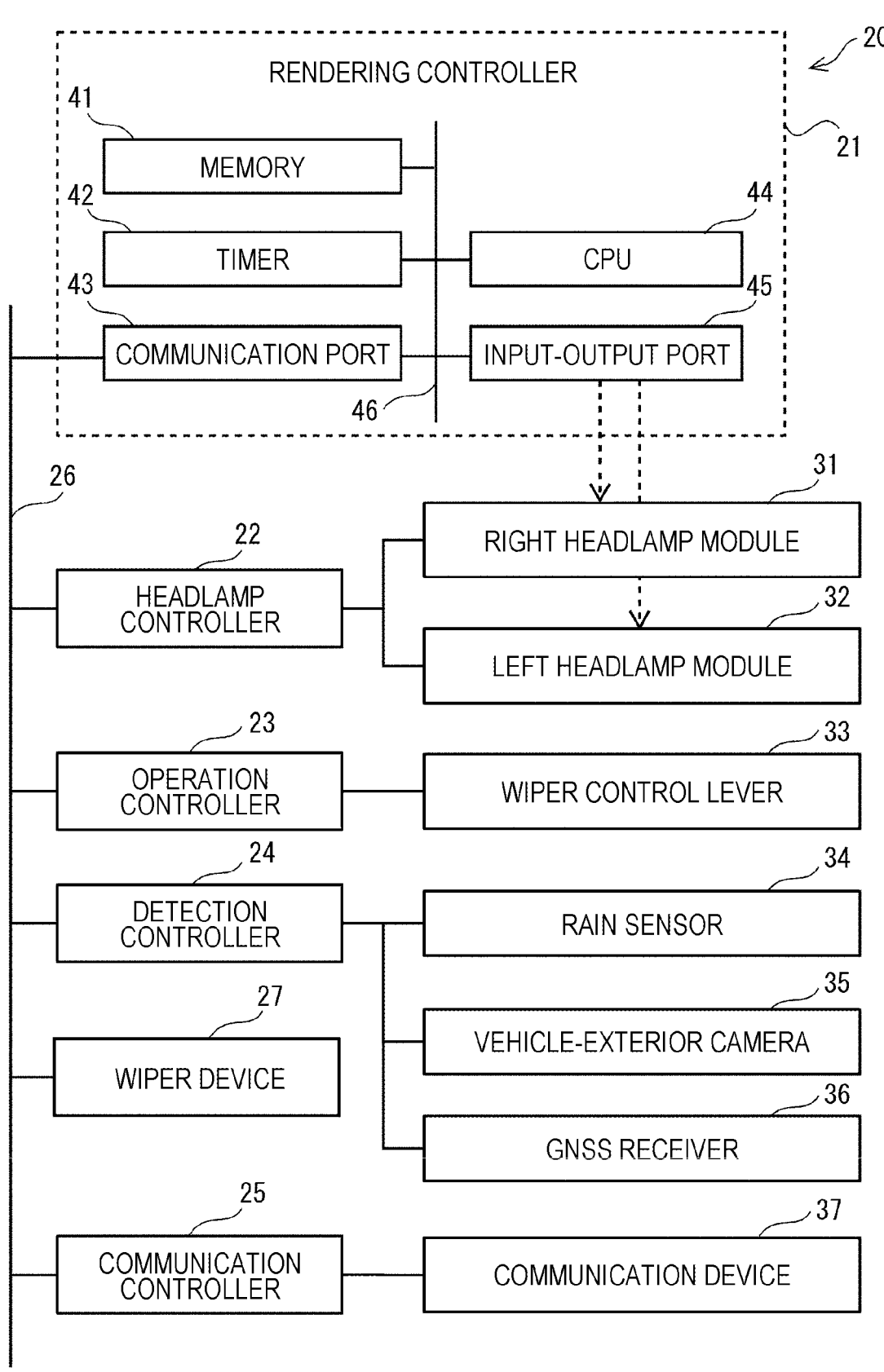
FIG. 2 illustrates a control system provided in the vehicle in FIG. 1.

FIG. 2 illustrates a control system 20 provided in the vehicle 1 in FIG. 1.

The control system 20 of the vehicle 1 in FIG. 2 has multiple controllers and a vehicle network 26 coupled thereto.

The vehicle network 26 may be a wired communication network compliant with, for example, a controller area network (CAN) or a local interconnect network (LIN) for the vehicle 1. The vehicle network 26 may be a communication network, such as a local area network (LAN), or a combination of the above. The vehicle network 26 may partially include a wireless communication network. The aforementioned devices coupled to the vehicle network 26 can exchange information with one another via the vehicle network 26.

FIG. 2 also illustrates a rendering controller 21, a headlamp controller 22, an operation controller 23, a detection controller 24, a communication controller 25, and a wiper device 27 as examples of the multiple controllers. The vehicle network 26 may also be coupled to controllers other than the above, such as a travel controller and an air-conditioning controller. Each controller illustrated in FIG. 2 may be split into multiple units and be coupled to the vehicle network 26.

The headlamp controller 22 is coupled to a right headlamp module 31 and a left headlamp module 32 that are provided at the front end of the vehicle 1. The right headlamp module 31 and the left headlamp module 32 are headlamp members that project light forward of the vehicle 1.

As will be described later, the right headlamp module 31 and the left headlamp module 32 according to this embodiment each have a light projection module 53 for road-surface rendering. In this embodiment, the light projection module 53 of the right headlamp module 31 and the light projection module 53 of the left headlamp module 32 serve as light projection members capable of projecting light for road-surface rendering in the traveling vehicle 1 and rendering the road-surface rendered image 11 onto the road surface surrounding the traveling vehicle 1.

The headlamp controller 22 controls the on mode of the right headlamp module 31 and the on mode of the left headlamp module 32 in accordance with information acquired via the vehicle network 26. Such information includes operational information about a lamp control lever (not illustrated) and information about a detection value of a light quantity sensor for an automatic light (not illustrated). Normally, the lamp control lever can be set in any of operational modes including a low beam mode, a high beam mode, and an off mode.

The headlamp controller 22 may output the information about the on mode of the right headlamp module 31 and the on mode of the left headlamp module 32 to another controller via the vehicle network 26.

The operation controller 23 is coupled to other operational members to be operated by an occupant, such as the driver. FIG. 2 illustrates a wiper control lever 33 as an operational member. The wiper control lever 33 is used for controlling the operation of the wiper device 27 for wiping the outer surface of the windshield of the vehicle 1. Normally, the wiper control lever 33 can be set in any of operational modes including an intermittent driving mode, a continuous driving mode, a high-speed continuous driving mode, and a stop mode.

The operation controller 23 may output information about the operational modes of various operational members, such as the wiper control lever 33, to another controller, such as the wiper device 27, via the vehicle network 26.

The wiper device 27 wipes the outer surface of the windshield of the vehicle 1 when the wiper control lever 33 is operated. The wiper device 27 removes dust and raindrops adhered to the outer surface of the windshield of the vehicle 1 from the outer surface of the windshield.

The detection controller 24 is coupled to various detection members for detecting, for example, the traveling state and the travel environment of the vehicle 1. FIG. 2 illustrates a rain sensor 34, a vehicle-exterior camera 35, and a global navigation satellite system (GNSS) receiver 36 as the detection members.

The detection controller 24 may output, for example, detection information of the rain sensor 34 to another controller via the vehicle network 26.

The rain sensor 34 is provided on the outer surface of the windshield of the vehicle 1 and can detect rain and the amount of rainfall based on a change in an electrified state according to wetness caused by raindrops on the rain sensor 34.

As illustrated in FIG. 1, the vehicle-exterior camera 35 is provided facing forward in a vehicle cabin located within the windshield of the vehicle 1. The vehicle-exterior camera 35 can capture an image forward of the vehicle 1 in the traveling direction thereof. The vehicle-exterior camera 35 may include multiple vehicle-exterior cameras provided in the vehicle 1. The multiple vehicle-exterior cameras 35 may capture images of the environment surrounding the vehicle 1 in a split fashion. Alternatively, the vehicle-exterior camera 35 may be a 360° Camera or a stereo camera.

The captured image obtained by the vehicle-exterior camera 35 may include, as a detection image, an image rendered on the road surface in accordance with light projection.

In addition to the vehicle-exterior camera 35, other devices that detect the environment surrounding the vehicle 1 include a Lidar and a laser. Similar to the captured image obtained by the vehicle-exterior camera 35, detection information obtained by the Lidar and the laser can be used as information about the environment surrounding the vehicle 1.

The vehicle-exterior camera 35, the Lidar, and the laser provided in the vehicle 1 may serve as detection devices capable of detecting the road surface onto which the road-surface rendered image 11 is projected.

The vehicle-exterior camera 35, the Lidar, and the laser are capable of detecting the road surface serving as a detection range that is larger than the light projection range of the road surface onto which the road-surface rendered image 11 is projected.

The GNSS receiver 36 receives radio waves from multiple GNSS satellites and detects positional information and time information about the vehicle 1 provided with the GNSS receiver 36.

The communication controller 25 is coupled to a communication device 37. The communication device 37 exchanges information with a server via, for example, a base station (not illustrated). The base station may be, for example, a 5G base station, an advanced driver-assistance system (ADAS) base station, or an intelligent transport system (ITS) base station. A 5G base station may be capable of implementing a server function. The communication device 37 may directly communicate with, for example, another vehicle 1 by vehicle-to-X (V2X) communication.

The communication controller 25 may transmit information acquired from the vehicle network 26 from the communication device 37 to the base station or the server, or may output information received by the communication device 37 from the base station or the server to the vehicle network 26.

The rendering controller 21 has a memory 41, a timer 42, a communication port 43, an input-output port 45, a central processing unit (CPU) 44, and an internal bus 46 coupled to these units. Each controller provided in the control system 20 may basically have the same structure as the rendering controller 21.

The input-output port 45 is coupled to the right headlamp module 31 and the left headlamp module 32.

The communication port 43 is coupled to the vehicle network 26. The communication port 43 acquires information from the vehicle network 26 and outputs information output by the rendering controller 21 to the vehicle network 26.

The timer 42 measures a time period or a time point. The time point measured by the timer 42 may be corrected in accordance with a time point obtained by the GNSS receiver 36.

The memory 41 may include, for example, a semiconductor memory, a hard disk drive (HDD), and a random access memory (RAM). The HDD is a nonvolatile memory. The RAM is a volatile memory. The memory 41 stores, as data, a program to be executed by the CPU 44 and various kinds of information to be used during the execution of the program. For example, the memory 41 stores data of the multiple light projection patterns 60 illustrated in FIG. 1.

The CPU 44 loads and executes the program stored in the memory 41. Accordingly, the CPU 44 serves as a control unit of the rendering controller 21. In this embodiment, the CPU 44 serves as a control unit that controls the light projection for the road-surface rendering by the light projection members 53.

The CPU 44 serving as a control unit controls the operation of the rendering controller 21. Furthermore, the CPU 44 serving as a control unit outputs signals to the right headlamp module 31 and the left headlamp module 32 via the communication port 43. Accordingly, the CPU 44 serving as a control unit controls the light projection modules 53 for road-surface rendering provided in the right headlamp module 31 and the left headlamp module 32. The right headlamp module 31 and the left headlamp module 32 emit light based on a light projection pattern for road-surface rendering. For example, as illustrated in FIG. 1, the road-surface rendered image 11 corresponding to the light projection pattern may be rendered on the road surface.

The CPU 44 serving as a control unit can control the light projection for the road-surface rendering by the light projection members 53 in accordance with the detection (captured image) by the vehicle-exterior camera 35 serving as a detection device.

Figure 3:
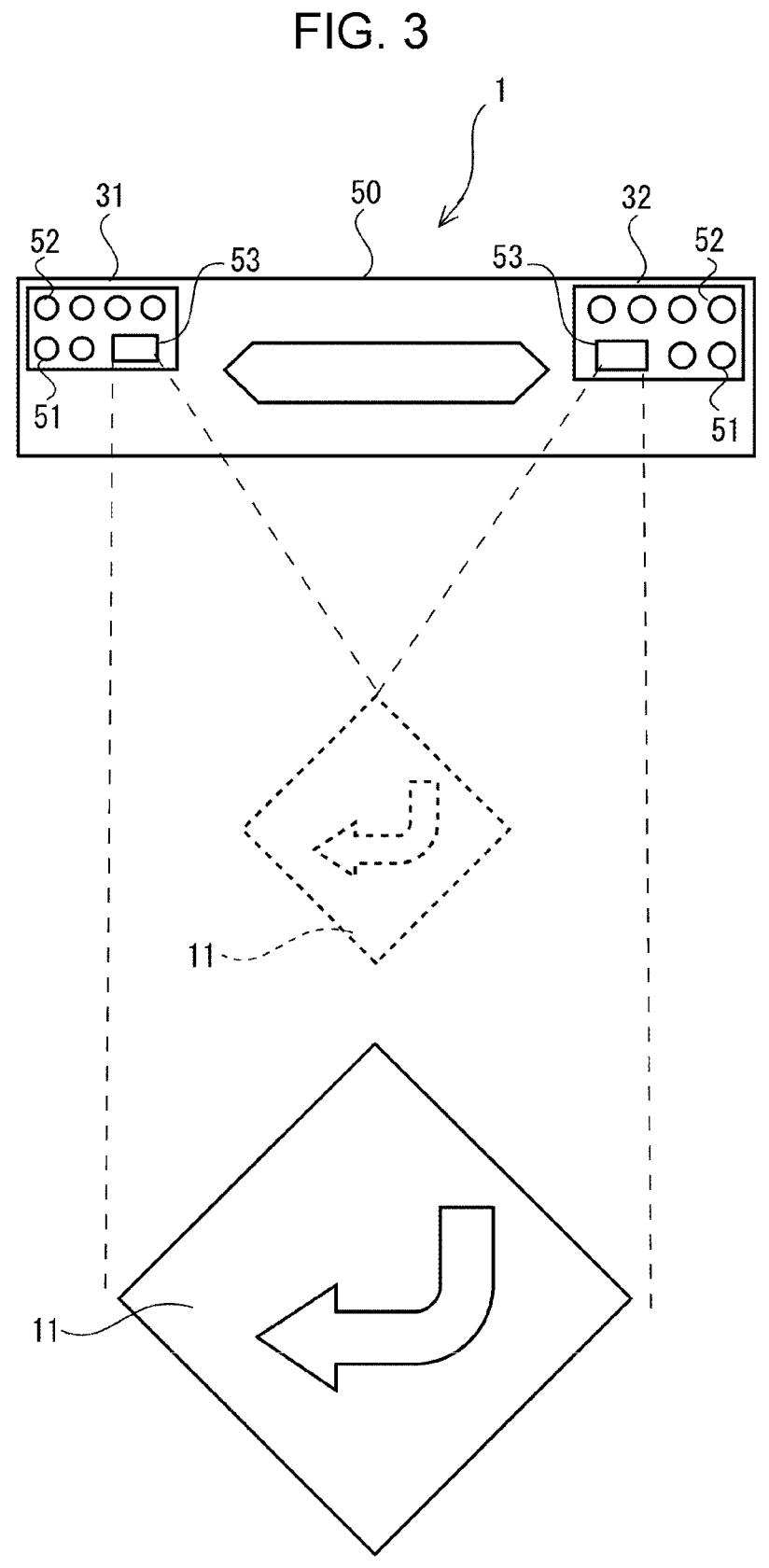

FIG. 3 schematically illustrates the structure and the disposition of the right headlamp module 31 and the left headlamp module 32 at the front end of the vehicle 1 in FIG. 1.

FIG. 3 illustrates the front end of the vehicle 1.

The right end at the front end of the vehicle 1 is provided with the right headlamp module 31. The right headlamp module 31 has multiple low-beam light-emitting diodes (LEDs) 51, multiple high-beam LEDs 52, and a micro-electro-mechanical system (MEMS) light projection module 53.

The left end at the front end of the vehicle 1 is provided with the left headlamp module 32. The left headlamp module 32 has multiple low-beam LEDs 51, multiple high-beam LEDs 52, and a MEMS light projection module 53.

The light projection modules 53 may alternatively be, for example, digital micro-mirror device (DMD) light projection modules.

For example, each MEMS light projection module 53 may be configured to project light by reflecting three primary colors of light by using a MEMS element. The reflection mode of the MEMS element may be controlled in accordance with an image signal.

The right headlamp module 31 or the left headlamp module 32 may be capable of rendering an image other than that of the MEMS light projection module 53 on the road surface.

Each MEMS light projection module 53 may be capable of projecting light within the irradiation range of all of the multiple low-beam LEDs 51 and the multiple high-beam LEDs 52, as well as projecting light outside the irradiation range. The rendering pattern for the no-crossing indication for the pedestrian 3 in FIG. 1 is partially outside the irradiation range of all of the multiple low-beam LEDs 51 and the multiple high-beam LEDs 52.

In FIG. 3, the MEMS light projection module 53 of the right headlamp module 31 projects light, so that a road-surface rendered image 11 for a right-turn indication corresponding to the right-turn-indication light projection pattern 65 is rendered on the road surface. The road-surface rendered image 11 can be rendered at different positions, as illustrated in FIG. 3, within the light projectable range of the two light projection modules 53. The size of the road-surface rendered image 11 is also changeable within the light projectable range of the two light projection modules 53.

In FIG. 3, the MEMS light projection module 53 of the right headlamp module 31 and the MEMS light projection module 53 of the left headlamp module 32 may operate in cooperation with each other to render multiple large road-surface rendered images 11 on the road surface.

The CPU 44 serving as a control unit controls the MEMS light projection module 53 of the right headlamp module 31 and the MEMS light projection module 53 of the left headlamp module 32 in accordance with a light projection pattern, so as to be capable of rendering a road-surface rendered image 11 corresponding to the light projection pattern on the road surface. Accordingly, the MEMS light projection module 53 of the right headlamp module 31 and the MEMS light projection module 53 of the left headlamp module 32 can serve as light projection members that project the road-surface rendered image 11 in accordance with the light projection pattern.

Figure 4:
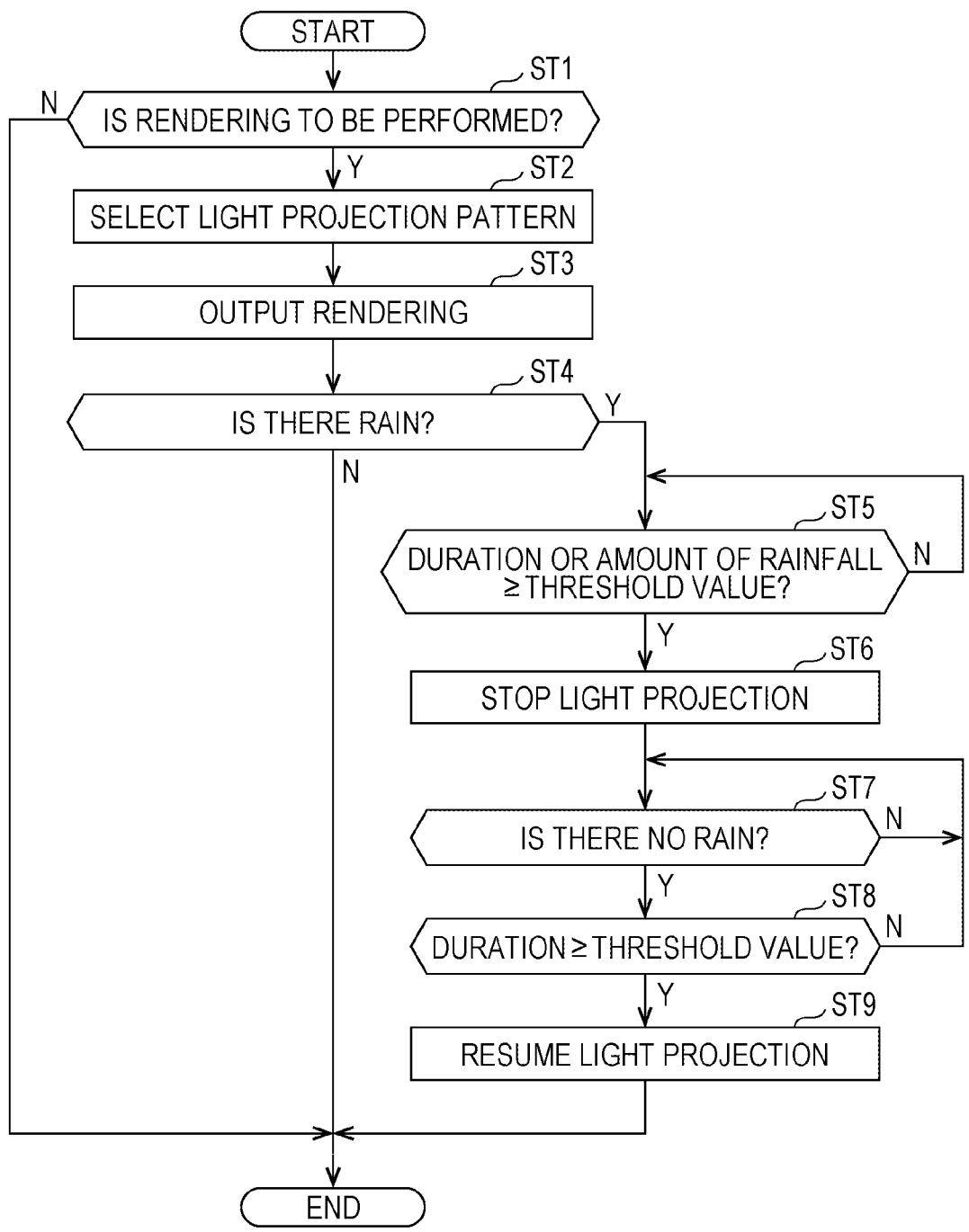
FIG. 4 is a flowchart of road-surface rendering control according to the embodiment executed by a rendering controller in FIG. 2.

FIG. 4 is a flowchart of road-surface rendering control according to the first embodiment executed by the rendering controller 21 in FIG. 2.

The CPU 44 serving as a control unit of the rendering controller 21 repeatedly executes the road-surface rendering control in FIG. 4.

When a rendering control function is implemented in the headlamp controller 22 in the control system 20, the CPU of the headlamp controller 22 may serve as a control unit that repeatedly executes the road-surface rendering control in FIG. 4.

In step ST1, the CPU 44 that controls light projection for road-surface rendering determines whether road-surface rendering is to be performed. A request for road-surface rendering may be generated by each controller in the control system 20. For example, when the headlamp is to be turned on, the headlamp controller 22 may generate information for requesting road-surface rendering and output the information to the rendering controller 21 via the vehicle network 26. When there is a request for road-surface rendering, the CPU 44 causes the process to proceed to step ST2. When there is no request for road-surface rendering, the CPU 44 ends the control.

In step ST2, the CPU 44 selects a light projection pattern to be used for the road-surface rendering from the multiple light projection patterns 60 stored in the memory 41. The CPU 44 may select multiple light projection patterns.

In step ST3, the CPU 44 controls the light projection module 53 of the right headlamp module 31 and the light projection module 53 of the left headlamp module 32 to irradiate the road surface with light according to the selected light projection pattern. Accordingly, a road-surface rendered image 11 corresponding to the light projection pattern is rendered on the road surface.

In step ST4, the CPU 44 determines whether there is rain.

For example, the CPU 44 may determine whether there is rain by acquiring rain detection information from the rain sensor 34 provided in the vehicle 1.

Alternatively, for example, the CPU 44 may determine whether there is rain by acquiring operational information from the wiper device 27 provided in the vehicle 1. The wiper device 27 basically operates when there is rain.

In this case, the rain sensor 34 or the wiper device 27 serves as a rain detection member.

When there is rain, the CPU 44 causes the process to proceed to step ST5.

When there is no rain, the CPU 44 ends the control. In this case, the road-surface rendering started in step ST3 continues. The CPU 44 may continue with the road-surface rendering until determining that the rendering is not to be performed in step ST1 in subsequent control.

In step ST5, the CPU 44 determines the duration of the rain or the amount of rainfall as a rain status. If there is a large amount of rainfall, the detection value of the rain sensor 34 changes greatly. The operation of the wiper device 27 is also switched from an intermittent operation mode to a continuous operation mode. The CPU 44 may also cause the timer 42 to measure the time elapsed from the start of the rain.

Then, for example, when the duration of the rain is greater than or equal to a threshold value, the CPU 44 causes the process to proceed to step ST6. Alternatively, when the amount of rainfall is greater than or equal to a threshold value, the CPU 44 causes the process to proceed to step ST6. Otherwise, the CPU 44 repeats the process.

In step ST6, the CPU 44 stops the output of projected light started in step ST3. The CPU 44 controls the light projection module 53 of the right headlamp module 31 and the light projection module 53 of the left headlamp module 32 to stop the output from these light projection modules 53. Accordingly, the road-surface rendered image 11 on the road disappears.

Accordingly, when the rain sensor 34 detects that the duration of the rain or the amount of rainfall is greater than or equal to the threshold value or when the operation period of the wiper device 27 is greater than or equal to a threshold value, the CPU 44 determines that there is predetermined rain and performs suppression to stop the light projection for the road-surface rendered image 11 from the light projection members 53.

In step ST7, the CPU 44 determines whether the rain has stopped. When the rain stops, the detection value of the rain sensor 34 returns to a value corresponding to a non-wet state. The wiper device 27 stops operating.

If the rain has not stopped, the CPU 44 repeats the process. When the rain stops, the CPU 44 causes the process to proceed to step ST8.

In step ST8, the CPU 44 determines the time elapsed from when the rain has stopped. The CPU 44 may cause the timer 42 to measure the time elapsed from when the rain has stopped.

Then, for example, if the time elapsed from when the rain has stopped is not greater than or equal to a threshold value, the CPU 44 causes the process to return to step ST7. The CPU 44 repeats the process from step ST8 to step ST9 until the time elapsed from when the rain has stopped becomes greater than or equal to the threshold value. Meanwhile, the light projection for the road-surface rendered image 11 from the light projection members 53 is continuously stopped.

When the time elapsed from when the rain has stopped becomes greater than or equal to the threshold value, the CPU 44 causes the process to proceed to step ST9.

In step ST9, the CPU 44 resumes the previously-stopped light projection for the road-surface rendered image 11. The CPU 44 controls the light projection module 53 of the right headlamp module 31 and the light projection module 53 of the left headlamp module 32 to irradiate the road surface with light according to the selected light projection pattern. Accordingly, a road-surface rendered image 11 corresponding to the light projection pattern is rendered again on the road surface. Subsequently, the CPU 44 ends the control.

Accordingly, the CPU 44 serving as a control unit can control the light projection for the road-surface rendering by the light projection members 53 in accordance with the detection by the rain sensor 34 or wiper device 27 serving as a rain detection member. When the rain detection member detects rain or a rain-associated state, the CPU 44 can determine that there is rain and suppress the light projection for the road-surface rendered image 11 from the light projection members 53.

Accordingly, the vehicle 1 according to this embodiment has the rain detection member 34 or 27 that detects rain or a rain-associated state. When the rain detection member 34 or 27 detects rain or a rain-associated state, the CPU 44 serving as a control unit that controls the light projection for the road-surface rendering by the light projection members 53 capable of performing the light projection for the road-surface rendering in the traveling vehicle 1 and rendering the road-surface rendered image 11 onto the road surface surrounding the traveling vehicle 1 determines that there is rain and suppresses the light projection for the road-surface rendered image 11 from the light projection members 53.

Accordingly, in this embodiment, for example, when the road surface is entirely wet due to rain, the light projection for the road-surface rendering from the vehicle 1 can be suppressed. In this embodiment, continuous rendering of the road-surface rendered image 11 that is difficult to visually recognize by the driver who drives the vehicle 1 can be prevented. Moreover, in this embodiment, total reflection on the road surface that is wet due to rain is less likely to occur, so that the driver who drives the oncoming vehicle 2 and the pedestrian 3 walking toward the vehicle 1 are less likely to be irradiated with intense light via the road surface.

Accordingly, this embodiment involves controlling the light projection for the road-surface rendering so that an improvement in the road-surface rendering from the vehicle 1 can be expected.

Second Embodiment

Next, a road-surface rendering device of the vehicle 1 according to a second embodiment of the disclosure will be described.

This embodiment relates to an example where the light projection for rendering the road-surface rendered image 11 onto the road surface is controlled by using a rain detection member different from that in the above embodiment.

The following description mainly relates to differences from the above embodiment.

Figure 5:
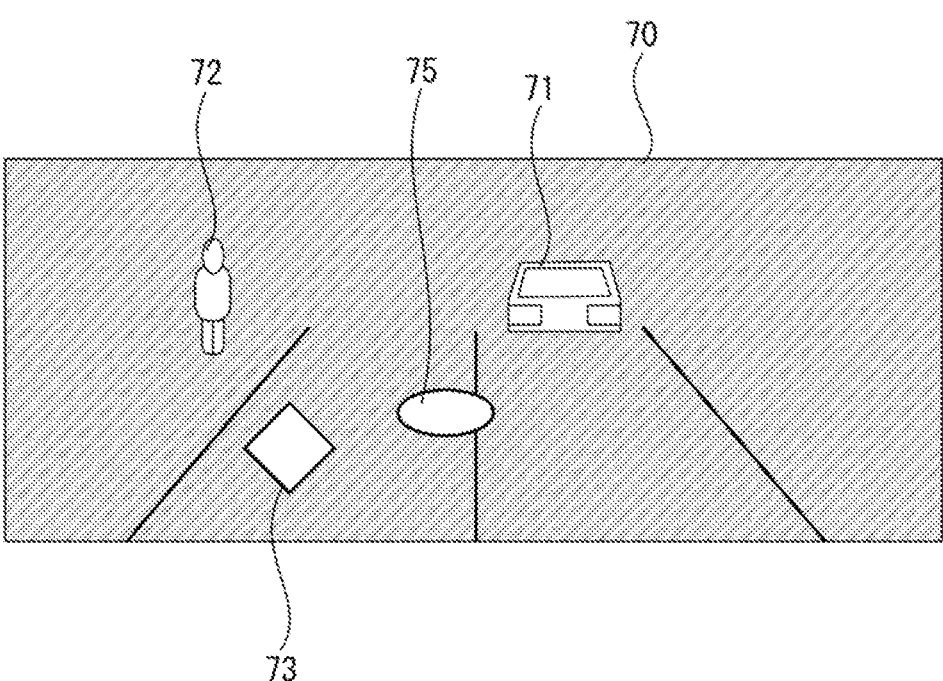
FIG. 5 illustrates a captured image obtained by a vehicle-exterior camera in FIG. 2.

FIG. 5 illustrates a captured image 70 obtained by the vehicle-exterior camera 35 in FIG. 2.

The captured image 70 in FIG. 5 is captured by the vehicle-exterior camera 35 of the vehicle 1 in the traveling state in FIG. 1.

Therefore, the captured image 70 in FIG. 5 includes an image 71 of the oncoming vehicle 2, an image 72 of the pedestrian 3, a detection image 73 corresponding to the road-surface rendered image 11, and an image 75 of the puddle 4 on the road surface, together with the road on which the vehicle 1 is traveling. The image 75 of the puddle 4 on the road surface appears as a bright image due to the light from the headlamp of the oncoming vehicle 2.

The vehicle-exterior camera 35 detects, as a detection range, a range larger than a light projection range (i.e., a road-surface area where multiple road-surface rendered images 11 are rendered) where the road-surface rendered images 11 are rendered by the light projection members 53.

The detection range of the vehicle-exterior camera 35 at least widens forward in the traveling direction of the vehicle 1, as compared with the light projection range of the light projection members 53.

This embodiment focuses on the fact that such a captured image 70 can be obtained, and uses the vehicle-exterior camera 35 provided in the vehicle 1 as a rain detection member.

Figure 6:
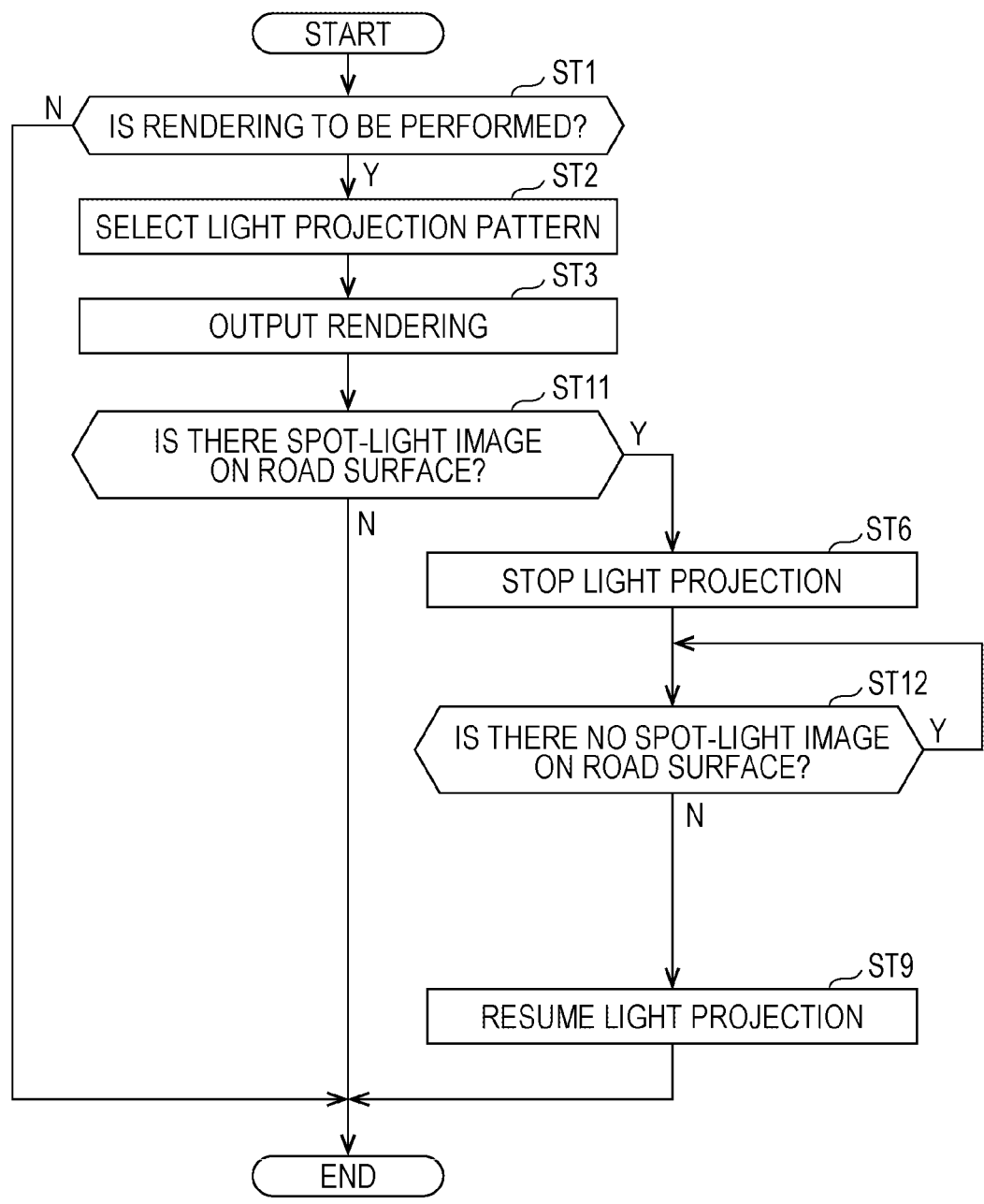
FIG. 6 is a flowchart of road-surface rendering control according to an embodiment executed by the rendering controller in FIG. 2.

FIG. 6 is a flowchart of road-surface rendering control according to the second embodiment executed by the rendering controller 21 in FIG. 2.

The CPU 44 serving as a control unit of the rendering controller 21 repeatedly executes the road-surface rendering control in FIG. 6.

When the rendering control function is implemented in the headlamp controller 22 in the control system 20, the CPU of the headlamp controller 22 may repeatedly execute the road-surface rendering control in FIG. 6.

Step ST1 to step ST3 are similar to those in the above embodiment.

However, after step ST3, the CPU 44 causes the process to proceed to step ST11.

In step ST11, the CPU 44 acquires the latest captured image 70 detected by the vehicle-exterior camera 35 and determines a rain-associated state based on the captured image 70. In detail, as the rain-associated state, the CPU 44 determines that the captured image 70 includes a captured image of spot light on the road surface other than a light source from a street light, an oncoming vehicle, or a leading vehicle. The image 75 of the puddle 4 on the road surface that is brighter than the light from the headlamp of the oncoming vehicle 2 is spot light on the road surface.

If the captured image 70 does not include spot light on the road surface, the CPU 44 determines that there is no rain and ends the control.

In contrast, if the captured image 70 includes a captured image of spot light on the road surface, the CPU 44 determines that there is rain and causes the process to proceed to step ST6. The CPU 44 stops the light projection in step ST6 and causes the process to proceed to step ST12.

In step ST12, the CPU 44 acquires the latest captured image 70 detected by the vehicle-exterior camera 35 and determines a rain-associated state based on the captured image 70. In detail, as the rain-associated state, the CPU 44 determines that the captured image 70 does not include a captured image of spot light on the road surface.

If the captured image 70 includes a captured image of spot light on the road surface, the CPU 44 determines that there is rain and continues with the process.

In contrast, if the captured image 70 does not include spot light on the road surface, the CPU 44 determines that there is no rain and causes the process to proceed to step ST9. The CPU 44 resumes the light projection in step ST9 and ends the control.

Accordingly, in this embodiment, if the captured image 70 obtained by the vehicle-exterior camera 35 includes spot light on the road surface, the CPU 44 serving as a control unit determines that there is rain and can perform control to suppress the light projection for the road-surface rendered image 11 from the light projection members 53. Subsequently, when the captured image 70 obtained by the vehicle-exterior camera 35 no longer includes the captured image of the spot light on the road surface, the CPU 44 determines that the rain has stopped and can resume the light projection for the road-surface rendered image 11 from the light projection members 53.

Third Embodiment

Next, a road-surface rendering device of the vehicle 1 according to a third embodiment of the disclosure will be described.

In the above embodiments, the light projection for the road-surface rendering is stopped when there is rain. This embodiment relates to an example where the light projection for the road-surface rendering is maintained as much as possible even when there is rain.

The following description mainly relates to differences from the above embodiments.

Figure 7:
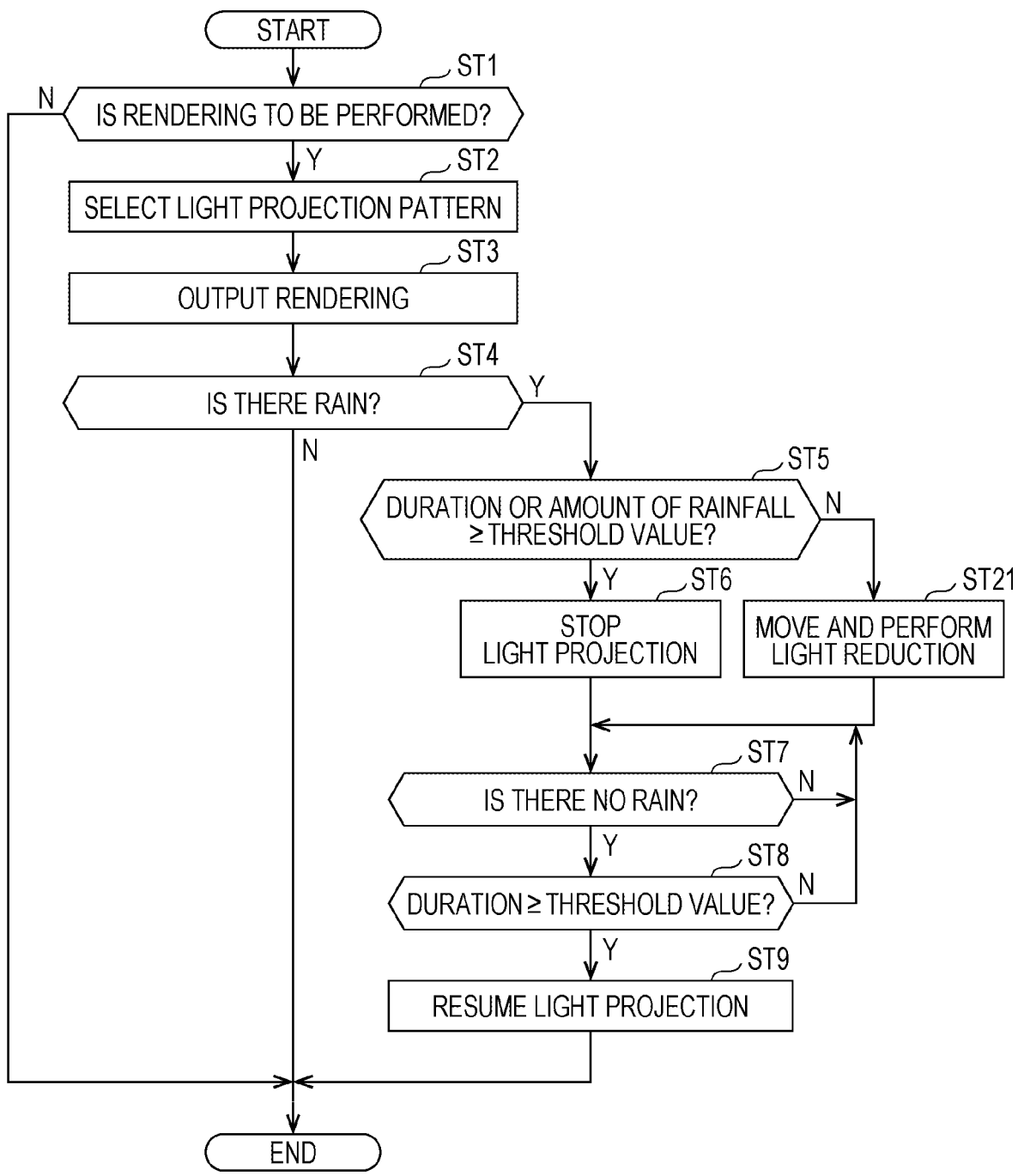
FIG. 7 is a flowchart of road-surface rendering control according to an embodiment executed by the rendering controller in FIG. 2.

FIG. 7 is a flowchart of road-surface rendering control according to the third embodiment executed by the rendering controller 21 in FIG. 2.

The CPU 44 serving as a control unit of the rendering controller 21 repeatedly executes the road-surface rendering control in FIG. 7.

When the rendering control function is implemented in the headlamp controller 22 in the control system 20, the CPU of the headlamp controller 22 may repeatedly execute the road-surface rendering control in FIG. 7.

Step ST1 to step ST4 and step ST5 to step ST9 are similar to those in the above embodiments.

However, if it is determined in step ST5 that the duration of the rain is not greater than or equal to the threshold value or that the amount of rainfall is not greater than or equal to the threshold value, the CPU 44 causes the process to proceed to step ST21.

In step ST21, the CPU 44 suppresses the light projection started in step ST3 by light reduction instead of stopping the light projection as in step ST6.

In this case, as illustrated in FIG. 1 or FIG. 3, the CPU 44 moves the light projection position of the road-surface rendered image 11 on the road surface toward a position located closer toward the vehicle 1.

Moreover, the CPU 44 renders the road-surface rendered image 11 at the position located closer toward the vehicle 1 by reducing the size of the road-surface rendered image 11.

Together with this control, the CPU 44 performs light reduction with respect to the light projection started in step ST3.

Then, the CPU 44 causes the process to proceed to step ST7.

Accordingly, in this embodiment, when the duration of the rain is not greater than or equal to the threshold value or when the amount of rainfall is not greater than or equal to the threshold value, the CPU 44 serving as a control unit moves the light projection position for the road-surface rendered image 11 closer toward the vehicle 1 and performs light reduction, thereby suppressing the light projection for the road-surface rendered image 11. Consequently, when there is light rain, the light projection for the road-surface rendered image 11 can continue while reflection by the road-surface rendered image 11 can be suppressed.

In addition, since the light projection position for the road-surface rendered image 11 is moved closer toward the vehicle 1 regardless of the fact that the light quantity for the road-surface rendered image 11 is reduced, reduced visibility of the road-surface rendered image 11 for the driver who drives the vehicle 1 can be suppressed.

Furthermore, in this embodiment, the light quantity for the road-surface rendered image 11 is reduced, and the size of the road-surface rendered image 11 is reduced, so that the quantity of light from the road-surface rendered image 11 toward the oncoming vehicle 2 can be suppressed. In particular, in this embodiment, the light projection position for the road-surface rendered image 11 is moved closer toward the vehicle 1, so that light reflected toward the oncoming vehicle 2 from the road-surface rendered image 11 is actually less likely to reach, for example, the oncoming vehicle 2.

Although the above embodiments are examples of preferred embodiments of the disclosure, the embodiments of the disclosure are not limited thereto and permit various modifications and alterations so long as they do not depart from the scope of the embodiments of the disclosure.

In the above embodiments, each light projection module 53 serving as a light projection member is provided in the vehicle 1 integrally with the headlamp LEDs 51 and 52 in the right headlamp module 31 or the left headlamp module 32.

Alternatively, for example, each light projection module 53 serving as a light projection member may be provided in the vehicle 1 separately from the right headlamp module 31 or the left headlamp module 32. That is, the light projection member may include a light source.

Furthermore, the vehicle 1 may be provided with a single light projection module 53 or three or more light projection modules 53. The single light projection module 53 or the third light projection module 53 may be provided at the widthwise center of the front surface of the vehicle 1.

The vehicle according to the above embodiments of the disclosure has the rain detection member that detects rain or a rain-associated state. When the rain detection member detects rain or a rain-associated state, the control unit that controls the light projection for the road-surface rendering by the light projection members capable of performing the light projection for the road-surface rendering in the traveling vehicle and rendering the road-surface rendered image onto the road surface surrounding the traveling vehicle determines that there is rain and suppresses the light projection for the road-surface rendered image from the light projection members.

Accordingly, in the embodiments of the disclosure, for example, when the road surface is entirely wet due to rain, the light projection for the road-surface rendering from the vehicle can be suppressed. In the embodiments of the disclosure, continuous rendering of the road-surface rendered image that is difficult to visually recognize by the driver who drives the vehicle can be prevented. Moreover, in the embodiments of the disclosure, total reflection on the road surface that is wet due to rain is less likely to occur, so that the driver who drives the oncoming vehicle and the pedestrian walking toward the vehicle are less likely to be irradiated with intense light via the road surface.

Accordingly, the above embodiments of the disclosure involve controlling the light projection for the road-surface rendering so that an improvement in the road-surface rendering from the vehicle can be expected.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the rendering controller 21, the headlamp controller 22, the operation controller 23, the detection controller 24, the communication controller 25, the wiper device 27, and the vehicle network 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle having a road-surface rendering function, the vehicle comprising:
    a light projection member configured to perform light projection for road-surface rendering, the light projection member being configured to irradiate a road surface with light according to a selected light projection pattern selected from multiple light projection patterns each serving as a basis for a traffic-related symbol to be rendered on the road surface, so as to render, on the road surface, the traffic-related symbol corresponding to the selected light projection pattern;
    a rain detection member configured to perform detection of rain or a rain-associated state; and
    a control unit configured to control the light projection for the road-surface rendering by the light projection member in accordance with the detection by the rain detection member,
    wherein the control unit is configured to determine that the rain is falling and suppress the light projection from the light projection member when the rain detection member detects the rain or the rain-associated state.

2. The vehicle having the road-surface rendering function according to claim 1, wherein the rain detection member comprises a rain sensor provided in the vehicle or a wiper device configured to operate when the rain falls on the vehicle,
    wherein the control unit is configured to;
        determine that the rain is falling and suppress the light projection for the traffic-related symbol from the light projection member when a time period or an amount of the rain detected by the rain sensor is greater than or equal to a threshold value or when a time period in which the wiper device operates is greater than or equal to a threshold value; and
        determine that the rain has stopped and resume the light projection for the traffic-related symbol from the light projection member when a time period greater than or equal to a threshold value has elapsed after the rain is no longer detected by the rain sensor or when a time period greater than or equal to a threshold value has elapsed after the wiper device stops operating.

3. The vehicle having the road-surface rendering function according to claim 2,
    wherein the control unit is configured to suppress the light projection for the traffic-related symbol by stopping the light projection for the traffic-related symbol when the rain is falling.

4. The vehicle having the road-surface rendering function according to claim 2,
    wherein the control unit is configured to:
        suppress the light projection for the traffic-related symbol by stopping the light projection for the traffic-related symbol when a time period or an amount of the rain is greater than or equal to a threshold value; and
        suppress the light projection for the traffic-related symbol by moving a light projection position for the traffic-related symbol closer toward the vehicle and also by performing light reduction when the time period or the amount of the rain is not greater than or equal to the threshold value.

5. The vehicle having the road-surface rendering function according to claim 1,
    wherein the rain detection member comprises a vehicle-exterior camera provided in the vehicle, and
    wherein the control unit is configured to:
        determine that the rain is falling and suppress the light projection for the traffic-related symbol from the light projection member when the vehicle-exterior camera captures an image including spot light on the road surface as the rain-associated state; and
        determine that the rain has stopped and resume the light projection for the traffic-related symbol from the light projection member when the vehicle-exterior camera stops capturing the image including the spot light on the road surface.

6. The vehicle having the road-surface rendering function according to claim 5,
    wherein the control unit is configured to suppress the light projection for the traffic-related symbol by stopping the light projection for the traffic-related symbol when the rain is falling.

7. The vehicle having the road-surface rendering function according to claim 5,
    wherein the control unit is configured to:
        suppress the light projection for the traffic-related symbol by stopping the light projection for the traffic-related symbol when a time period or an amount of the rain is greater than or equal to a threshold value; and suppress the light projection for the traffic-related symbol by moving a light projection position for the traffic-related symbol closer toward the vehicle and also by performing light reduction when the time period or the amount of the rain is not greater than or equal to the threshold value.

8. The vehicle having the road-surface rendering function according to claim 5, wherein the spot light on the road is a puddle on the road surface.

9. The vehicle having the road-surface rendering function according to claim 1, wherein the control unit is configured to suppress the light projection for the traffic-related symbol by stopping the light projection for the traffic-related symbol when the rain is falling.

10. The vehicle having the road-surface rendering function according to claim 1, wherein the control unit is configured to:

suppress the light projection for the traffic-related symbol by stopping the light projection for the traffic-related symbol when a time period or an amount of the rain is greater than or equal to a threshold value; and suppress the light projection for the traffic-related symbol by moving a light projection position for the traffic-related symbol closer toward the vehicle and also by performing light reduction when the time period or the amount of the rain is not greater than or equal to the threshold value.

11. The vehicle having the road-surface rendering function according to claim 10, wherein the control unit is configured to move the light projection position for the traffic-related symbol closer toward the vehicle by reducing a size of the traffic-related symbol.

12. The vehicle having the road-surface rendering function according to claim 1, wherein the traffic-related symbol comprises at least one of a left-turn indication, a go-straight indication, a right-turn indication, a speed-limit indication, a stop-position indication, a no-crossing indication, or a snowy- or frozen-road warning indication.

13. The vehicle having the road-surface rendering function according to claim 1, wherein the control unit is configured to suppress the light projection for the traffic-related symbol by at least one of moving a light projection position for the traffic-related symbol closer toward the vehicle or performing light reduction.

14. The vehicle having the road-surface rendering function according to claim 1, wherein the vehicle further comprises a first light source configured to form high beam light and a second light source configured to form low beam light, and wherein the light projection member comprises a third light source configured to project light for rendering the traffic-related symbol on the road surface.

15. The vehicle having the road-surface rendering function according to claim 14, wherein the first light source comprises low beam LEDs, the second light source comprises high beam LEDs, and the third light source comprises a MEMS light projection module.

16. A vehicle having a road-surface rendering function, the vehicle comprising:

a light projection member including a light source and configured to perform light projection for road-surface rendering, the light projection member being configured to irradiate a road surface with light according to a selected light projection pattern selected from multiple light projection patterns each serving as a basis for a traffic-related symbol to be rendered on the road surface, so as to render, on the road surface, the traffic-related symbol corresponding to the selected light projection pattern; and circuitry configured to:

perform detection of rain or a rain-associated state;

control the light projection for the road-surface rendering by the light projection member in accordance with the detection; and determine that the rain is falling and suppress the light projection from the light projection member when the rain or the rain-associated state is detected.

17. The vehicle having the road-surface rendering function according to claim 16, wherein the traffic-related symbol comprises at least one of a left-turn indication, a go-straight indication, a right-turn indication, a speed-limit indication, a stop-position indication, a no-crossing indication, or a snowy- or frozen-road warning indication.

18. The vehicle having the road-surface rendering function according to claim 16, wherein the circuitry is configured to suppress the light projection for the traffic-related symbol by at least one of moving a light projection position for the traffic-related symbol closer toward the vehicle or performing light reduction.

19. The vehicle having the road-surface rendering function according to claim 16, wherein the vehicle further comprises a first light source configured to form high beam light and a second light source configured to form low beam light, and wherein the light projection member comprises a third light source configured to project light for rendering the traffic-related symbol on the road surface.

20. The vehicle having the road-surface rendering function according to claim 19, wherein the first light source comprises low beam LEDs, the second light source comprises high beam LEDs, and the third light source comprises a MEMS light projection module.

* * * * *